G. PALMER.
Carriage-Spring.
No 29,306
Patented July 24, 1860.
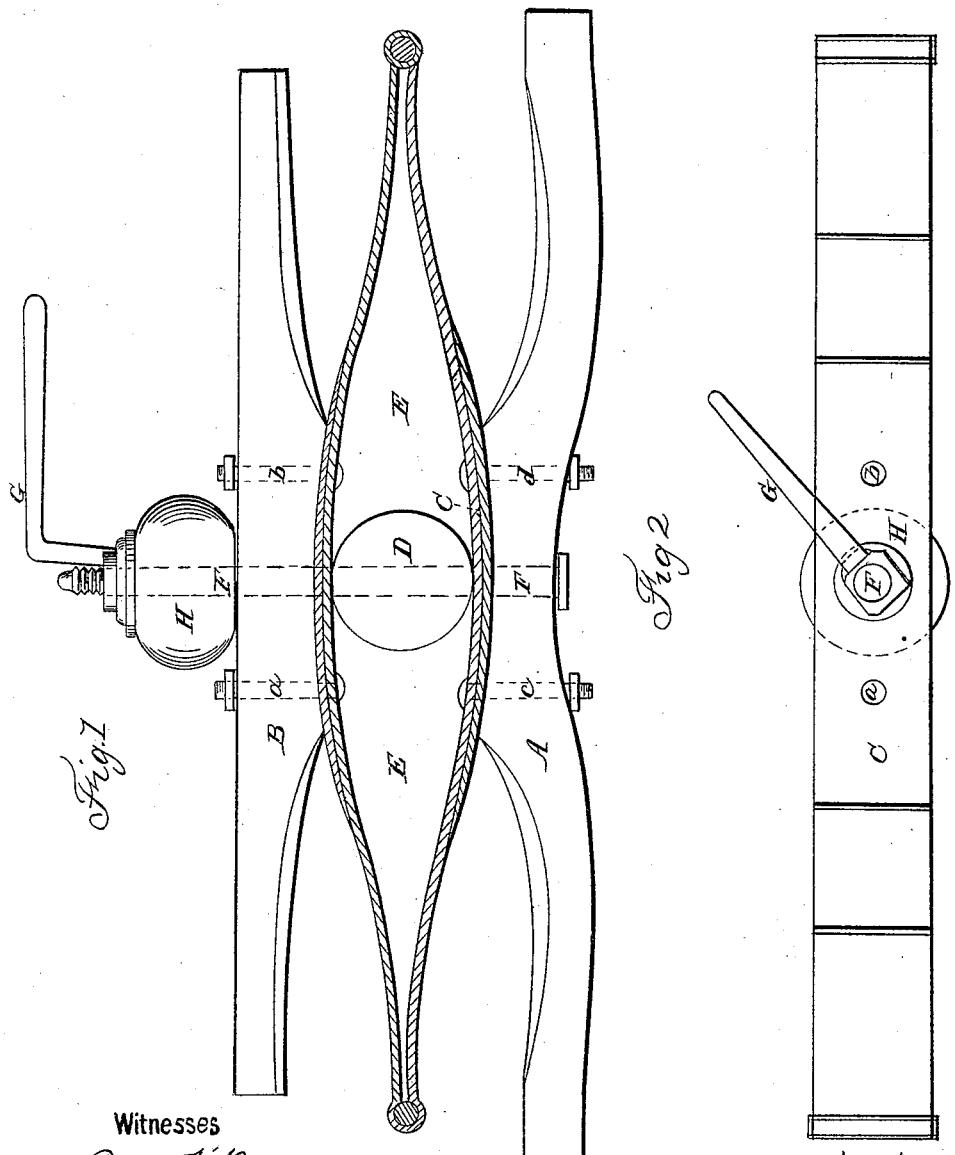
Witnesses
Edw. J. Brown
J. B. Woodruff
Inventor
George Palmer

UNITED STATES PATENT OFFICE.

GEORGE PALMER, OF LITTLESTOWN, PENNSYLVANIA.

ADJUSTABLE CARRIAGE-SPRING.

Specification of Letters Patent No. 29,306, dated July 24, 1860.

*To all whom it may concern:*

Be it known that I, GEORGE PALMER, of Littlestown, in the county of Adams, in the State of Pennsylvania, have invented new and useful Improvements in Regulating Elliptic Springs for Carriages and for other Purposes; and the following is a clear and exact description of the same, reference being had to the accompanying drawings, making a part of this specification.

Figure 1 shows the edge view of a spring between the axletree and bolster. Fig. 2, represents the top view of the spring.

My invention consists in placing india rubber, or an equivalent yielding substance between the top and bottom springs, and a similar substance, on the top of the bolster; or under the axletree, in combination with a bolt and screw nut, with which to regulate the tension of the springs, according to the number of persons, or weight to be carried, which supports a light spring, and prevents it from bumping, and the vehicle from bounding and tossing the passengers to their great annoyance—and oftentimes serious injury.

To enable others skilled in the art, to make and use my invention, I will describe it referring to the drawings, and the letters marked thereon.

In Fig. 1, (A and B) are the axletree, and bolster, or rocker between which a common elliptic spring (C, C,) is secured by bolts (a, b, c, d,) in the usual manner. In the space between the spring (C, C) I place an india rubber ball (D,) or a volute spring, or any yielding equivalent to fill the space (E, E,) when the spring is distended, through the center of the spring, and extending either up through the bolster (B,) or down through the axletree (A). I have a bolt or rod (F,) with a screw (f,) on the end onto which is fitted a nut, thumbscrew, or lever wrench (G,) for the purpose of compressing the substance (D,) between the springs (C, C,) and a similar, or equivalent substance (H,) above the bolster (B,) so that whether there be one person or six in the vehicle, the springs (C, C,) will be prevented from coming together, and bumping, and by turning the lever nut (G,) a few times on the rod (F,) the whole arrangement will be brought together, and may be so adjusted and the springs so regulated that the weight will not be tossed, or thrown violently by the vehicle being passed rapidly over a rough or irregular surface.

The tension of the springs can be regulated to make a carriage as steady, and ride as easy with one person in it, as with four, or six, which is not the case with any vehicle on springs that are not adjustable. When elliptic springs are made strong enough to sustain the weight of four or six persons, they are too stiff to yield easily to the weight of one, or two persons.

Among the advantages in having springs to be regulated by my method—it will be observed, that springs can be made much lighter, and with less leaves, and consequently have more elasticity, while they possess sufficient strength and support for heavy loads, the bolt or rod (F,) being set firmly in either the axletree, or bolster and passing through the center of the springs (C, C,) and their assistants (G, and H,) allowing them to slide on the bed (F,) which forms an excellent guide to prevent the lateral motion of the carriage body either way.

Having thus fully described my invention, what I claim as new and desire to secure by Letters Patent is—

Placing india-rubber, or an equivalent yielding substance, between elliptic springs for vehicles, and a similar substance on the top of the bolster, or rocker; or underneath the axletree, in combination with a regulating screw, and hand, or thumb-nut, all arranged substantially as, and for the purposes specified.

GEORGE PALMER.

Witnesses:
EDW. F. BROWN,
J. B. WOODRUFF.